United States Patent [19]

Youmans

[15] 3,665,195
[45] May 23, 1972

[54] THERMAL NEUTRON ACTIVATION RADIOACTIVITY LOGGING METHOD

[72] Inventor: Arthur H. Youmans, Houston, Tex.
[73] Assignee: Dresser Industries, Inc., Dallas, Tex.
[22] Filed: Oct. 16, 1969
[21] Appl. No.: 867,018

[52] U.S. Cl....................250/83.3 R, 250/83.6 W, 250/84.5
[51] Int. Cl. .........................................................G01v 5/00
[58] Field of Search..............250/83.3, 83.6 W, 84.5, 106 S

[56] References Cited

UNITED STATES PATENTS

| | | | |
|---|---|---|---|
| 2,991,364 | 7/1961 | Goodman | 250/83.6 W X |
| 3,184,598 | 5/1965 | Tittle | 250/83.6 W X |
| 3,379,882 | 4/1968 | Youmans | 250/83.6 W X |

OTHER PUBLICATIONS

Californium-252: A New Isotopic Source for Neutron Radiography, by W. C. Reinig, from Materials Evaluation, March 1969 pgs. 71 and 72

*Primary Examiner*—Archie R. Borchelt
*Attorney*—Robert W. Mayer, Thomas P. Hubbard, Jr., Daniel Rubin, Raymond T. Majesko, Roy L. Van Winkle, William E. Johnson, Jr., Roderick W. MacDonald and Eddie E. Scott

[57] ABSTRACT

A method of determining the existence and quantity of an element in a formation. A portion of the formation is irradiated with neutrons and the gamma rays emanating from the formation due to induced radio-activity, or "activation" from thermal neutron capture by the element of interest are detected and recorded. The thermal neutron capture cross section of the formation is determined. The product of the gamma ray emission and the thermal neutron capture cross section is obtained as a quantitative indication of the element's abundance in the formation.

14 Claims, 4 Drawing Figures

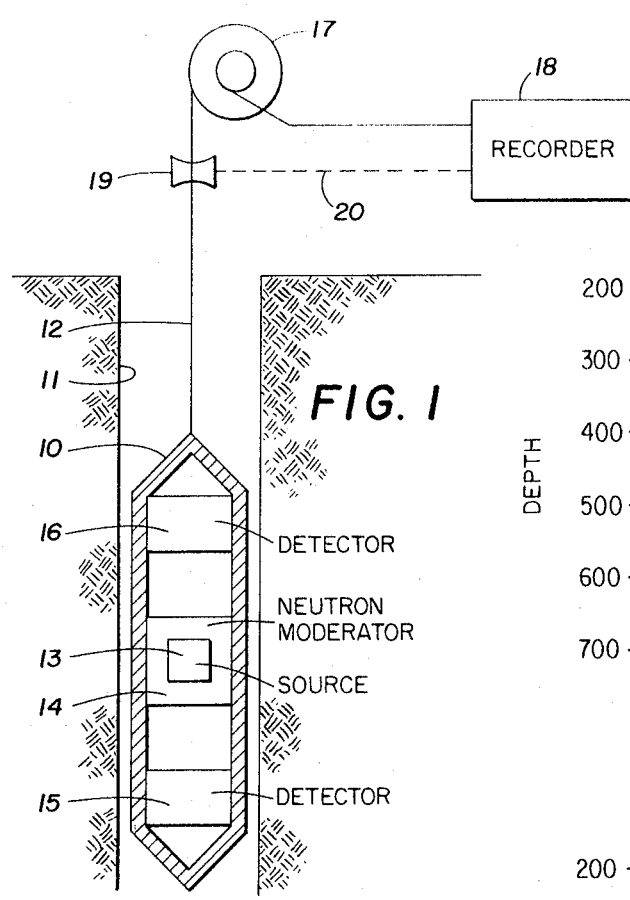
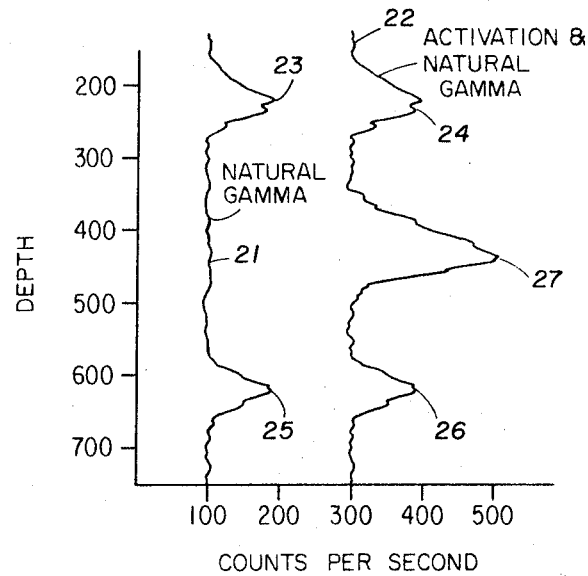
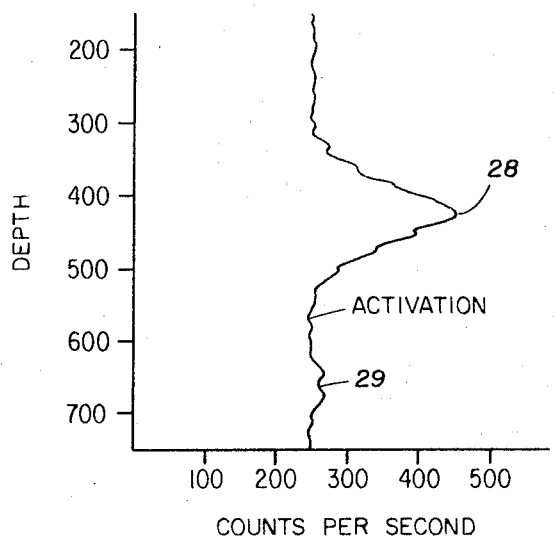
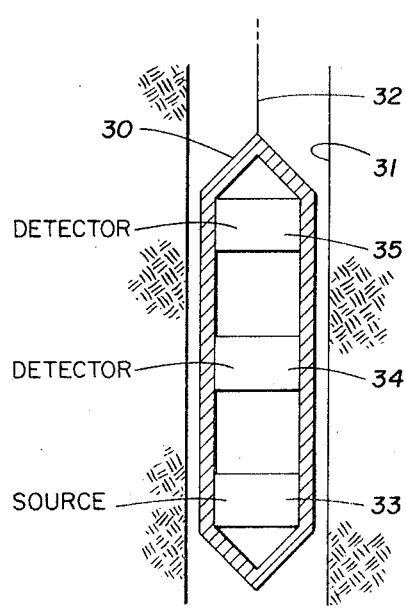
INVENTOR
ARTHUR H. YOUMANS
ATTORNEY

THERMAL NEUTRON ACTIVATION RADIOACTIVITY LOGGING METHOD

BACKGROUND OF THE INVENTION

This invention relates to geophysical prospecting and more particularly to an improved activation logging system and method for detecting the presence of elements wherein the detected activation is produced by thermal neutron capture. The invention provides for a measurement which includes compensation for variations in the thermal neutron capture cross section due to variance in composition of the formations.

Prior art systems have employed neutron sources such as deuterium-tritium accelerators or mixtures of beryllium and an alpha emitting radioactive element. Such sources are expensive and the intensity of neutron output is limited by cost.

The system of this invention may employ sources of the aforementioned types. Alternatively a californium-252 source may be used. Californium promises to be far less expensive than other neutron sources and relatively free of undesirable gamma radiation. In addition, californium neutron sources are small and therefore have a high degree of utility and adaptability in the design of specific equipment. Moreover, californium-252 produces neutrons due to spontaneous fission and the produced neutrons are relatively low in energy. Since the present invention relates to the measurement of activation produced by thermal neutrons, the relatively low energy of californium-252 neutrons makes such a source advantageous in certain embodiments of the invention.

Prior art systems have encountered difficulties due to the fact that activation occurs not only in the element of interest, but also in oxygen and silicon, which are present in many earth formations and thus often produce an undesirable masking effect. The relatively low energy neutrons of californium neutron sources produce no oxygen activation and therefore the adverse masking effect of oxygen activation is eliminated.

Silicon activation is encountered only when the neutron energy reaching the formation is in excess of 3.9 mev. The low energy neutrons from californium produce relatively much less silicon activation than alpha-beryllium or (D,T) neutron sources. This invention provides a method of compensating for such silicon activation as does occur whereby the gamma ray emission due to silicon activation is subtracted from the gamma ray emission of the element of interest. Prior art methods have not considered the problem of varying thermal neutron capture cross sections due to variations in the composition of the formation and their effect upon activation logging.

The method of this invention compensates for variations in the thermal neutron capture cross section due to variance in composition of the formations.

In accordance with the present invention, the formation is irradiated by a source of neutrons. In a preferred embodiment, the source is californium-252 but other sources are also contemplated such as americium-beryllium, radium-beryllium, plutonium-beryllium or a deuterium-tritium accelerator such as the one described in U. S. Pat. No. 2,689,918. The delayed gamma radiation resulting from activation produced by thermal neutron capture by the element of interest is measured and recorded. The thermal neutron capture cross section of the formation is in dependently determined and an indication of the relative abundance of the element of interest is obtained by multiplying the measured gamma ray emission by the thermal neutron capture cross section.

It is therefore an object of the present invention to provide a system that will give a quantitative determination of an element's abundance within a formation.

It is a further object of this invention to provide an activation logging method that eliminates the masking effect of silicon.

It is a further object of this invention to provide a less complex and more accurate activation logging method than has previously existed.

It is a still further object of this invention to provide a radioactivity logging method for the measurement of formation aluminum having the advantage that the masking effect of oxygen is eliminated.

It is a still further object of this invention to provide a radioactivity logging method that provides compensation for variations in neutron capture cross sections.

It is a still further object of this invention to provide a logging method that will give a quantitative determination of the abundance of any element or elements activated by thermal neutron capture.

It is a still further object of this invention to provide a logging method that utilizes a californium-252 neutron source.

The above and other objects and advantages will become more apparent from consideration of the following detailed description when taken in conjunction with the accompanying drawings wherein:

FIG. 1 illustrates a means for irradiating various earth formations with neutrons and means for detecting gamma radiation from said formations.

FIG. 2 illustrates a natural gamma log and an activation log.

FIG. 3 illustrates an activation log after compensation for natural gamma radiation.

FIG. 4 illustrates a system used in performing the method of this invention.

Referring now to FIG. 1 there is illustrated schematically a subsurface equipment housing 10 adapted to be lowered into the ground through an earth borehole 11 by means of a logging cable 12. Contained within housing 10 is a neutron source 13, a neutron moderator 14 and two identical gamma ray detectors 15 and 16. Electrical signals from the detectors are transmitted to the surface by cable 12. The cable is wound on, or unwound from, drum 17 in raising and lowering the instrument 10 to traverse the earth borehole. The electrical signals are then transferred from drum 17 by conventional means to recorder 18. In order to correlate the signals with depth in the borehole, cable 12 is drawn over measuring reel 19 connected to the recorder by coupling 20. The elements are shown diagrammatically and it is to be understood that the associated circuits and power supplies are provided in the conventional manner. It is also to be understood that the instrument housing 10 will be constructed to withstand the pressures and mechanical and thermal abuses encountered in logging a deep well and provide adequate space within it to house the necessary apparatus and permit the transmission of radiation through it.

The neutron source 13 may be californium-252 or some other source capable of radiating neutrons. The source is surrounded by a moderator 14 such as polyethylene to reduce the portion of the neutrons reaching the formation with energies other than that required for activation of the element of interest. For example, 3.9 mev is the threshold activation energy for the silicon activation reaction $Si^{28}(n,p)Al^{28}$. By reducing the number of neutrons reaching the formation with energies in excess of 3.9 mev, the masking effect of silicon can be reduced.

When the instrument is moved through the borehole at a constant speed, or in certain instances a programmed speed, the detector preceding the neutron source detects natural gamma radiation emitted by naturally radioactive elements in the earth formations. For illustration purposes, the natural gamma radiation is shown as a natural gamma log 21 in FIG. 2. The detector trailing the source records the gamma radiation in the formation a short time after the neutron source has irradiated the formation. The gamma radiation detected by this detector is the natural gamma radiation plus the gamma radiation resulting from activation and for illustration purposes such a log is shown as the activation plus natural gamma log 22 in FIG. 2. Thermal neutron capture by certain elements of interest produces detectable activation. Considering the log shown in FIG. 2, two areas of relatively high radiation show on the natural gamma log, the first 23 at about 200 feet and the second 25 at about 600 feet. These areas also appear at the same respective depths on the activation plus natural gamma log 22 at 24 and 26. In addition, the activation plus natural gamma log 22 also shows an area of increased radiation 27 at approximately 400 feet.

It is apparent that if the natural gamma log is subtracted from the activation plus natural gamma log a log will result representing radiation due to activation only. FIG. 3 shows the natural gamma log subtracted from the activation plus natural gamma log and clearly points out the area of radiation 28 due only to activation.

The activation log 29 shown in FIG. 3 is a measure of activation which is directly related to the quantity of the element of interest existing in the formation. If the activation is produced by thermal neutron capture, then variation in the thermal neutron capture cross section of the formation will also cause variations in the amount of activation which is measured. This is because the number of neutrons emitted by the source remains constant whereas the number of neutrons captured by elements other than the element of interest varies when the thermal neutron capture cross section varies. Thermal neutron cross sections encountered in logging a borehole vary over a wide range because of the variety of compositions of the formations encountered. Accordingly the measured activation radiation cannot be taken as a measure of the abundance of the element of interest unless compensation as herein disclosed is employed.

For example, if the element of interest is aluminum, the total amount of thermal neutron activation of aluminum will vary inversely with the abundance of elements which compete for the total available thermal neutron population. Thus, if two formations contain the same amount of aluminum but one has twice the capture cross section of the other, the latter will have only half as much aluminum activation. Thus if $I_{al}$ is the measured gamma radiation intensity due to aluminum activation and $\Sigma$ is the thermal neutron capture cross section, the actual aluminum content of the formation is proportional to $I_{al} \times \Sigma$.

Among the various ways of determining the thermal neutron capture cross section of the formations is the system disclosed in U. S. Pat. No. 3,379,882 to A. H. Youmans. This system employs a pulsed neutron source and a gated radiation detector to measure the rate of decline of the thermal neutron population in the formation during the quiescent intervals between neutron bursts from the neutron source. The rate of decline of the thermal neutron population is mathematically related to the thermal neutron capture cross section $\Sigma$ of the formation. This relationship is explained in the paper "Neutron Lifetime, a New Nuclear Log" by Youmans et al. published in Journal of Petroleum Technology, March 1964. According to the procedures described in the aforementioned patent and publication it is possible to obtain a measurement of the formation capture cross section $\Sigma$. This is accomplished by running an instrument in the borehole which produces a Neutron Lifetime Log. In practicing the present invention a Neutron Lifetime Log may be run, thereby obtaining a measurement of $\Sigma$ in each formation to be assayed by activation. The values of $\Sigma$ as a function of depth in the borehole may be recorded on a conventional strip chart for visual or manual comparison with the activation log. Alternatively the $\Sigma$ log may be recorded on magnetic tape or punched paper tape to be subsequently played back in depth synchronism with the activation log to facilitate electronic computation of the compensated log. In cases where all activation which occurs is due to a single element activated only by thermal neutrons, a quantitative assay of that element will be obtained as explained above by computing the product of $\Sigma$ multiplied by the measured activation. It is of course understood that the measured activation will be a function of source intensity, instrument velocity, spacing between source and detector, detector efficiency and spectral sensitivity, and other parameters relating to borehole and instrument geometry. Accordingly it is essential that these parameters be maintained constant during the activation logging operation or that any variations be appropriately compensated for. Assuming constant conditions, the proportionality constant between measured activation and elemental abundance may be evaluated in formations or test pits having known concentrations of the element.

If, on the other hand, other elements contribute to the measured activation, compensation or correction for their effect is required. In particular, silicon activation may tend to mask the activation produced by thermal neutron capture in aluminum. As previously stated, silicon activation may be minimized by employing a source of low energy neutrons. Moreover, the neutron source may be surrounded by a moderator to further reduce the proportion of neutrons reaching the formation with energy in excess of 3.9 mev. In cases where an objectionable amount of silicon activation nevertheless occurs, an alternative method for compensating for silicon activation may be employed. In this method a silicon log is made independently and is used to correct the activation log so as to eliminate the contribution due to silicon. The silicon content of the formation might be known but in general an independent logging process is required. A silicon log is produced in a manner analagous to the activation logging technique described above except that an unmoderated source of 14 mev neutrons is employed to produce the activation. This results in a preponderance of the measured activation being due to reactions other than thermal neutron capture. In particular the measured activation is largely due to silicon. Such a silicon activation log may then be employed to correct for the undesired contribution of silicon which tends to mask the aluminum contribution. It will be apparent that the silicon contribution should be subtracted from the activation log, and that this contribution will be proportional to the silicon content. The proportionality constant may be determined experimentally in zones of known silicon and aluminum content. When the log has thus been corrected for the undesired contribution due to silicon, the corrected activation log, namely that produced by thermal neutron capture in aluminum, will as previously explained, require compensation for variations in thermal neutron capture cross section. Again as previously stated this compensation may be attained by forming the product of $\Sigma$ at each depth in the borehole with the corresponding activation measurement after correction for the silicon contribution.

One method of practicing the instant invention is to use two separate instruments cooperatively to obtain a log indicating the quantity of a specific element existing in various surface earth formations. For example, a determination of the quantity of aluminum present in the earth formations penetrated by an earth borehole may be obtained in the following manner. First a neutron lifetime logging instrument is run with a conventional gamma ray detector attached for making a conventional gamma ray log simultaneous with the Neutron Lifetime Log. Referring now to FIG. 4 an instrument 30 is shown suspended in an earth borehole 31 by logging cable 32. The instrument 30 contains a neutron source 33 and detectors 34 and 35. The source 33 and detector 34 are those required for producing a Neutron Lifetime Log as disclosed in U. S. Pat. No. 3,379,882 to A. H. Youmans and detector 35 is a conventional gamma ray adapter. The gamma ray detector 35 is above the neutron source 33 a distance such that it does not detect radiations from the source 33 during normal neutron lifetime logging in an upward direction. But while going downward into the borehole 31 with the neutron source 33 turned on, activation of silicon occurs in formations irradiated by the source 33 in passing. This activation radiation, having a halflife of 2.3 minutes, is detected along with natural gamma rays as the detector 35 moves past the activated zones. A silicon log with the natural gamma radiation subtracted out may be obtained by recording the total radiation — silicon activation plus natural gamma radiation — going into the hole, and natural gamma rays only while coming out of the hole. The two may then be subtracted to produce a silicon log. Also while coming out of the hole a log of $\Sigma$, the thermal neutron capture cross section is made. Then an aluminum thermal neutron activation log is run independently according to the procedures heretofore explained in connection with the apparatus shown in FIG. 1. Next the aluminum activation log is corrected for silicon activation and for natural gamma radiation by subtracting the appropriate proportions of these parameters in each logged interval. The resultant log is then multiplied by the thermal neutron capture cross section log to obtain a log representative of the aluminum content of the formations.

It should be recognized that if the intensity of the neutron source is sufficiently great so that the induced activation is large compared to background due to natural gamma radiation, then no correction for natural gamma radiation need be made. Similarly, if little or no obscuring activation such as silicon occurs, either by reason of such elements being absent or because the technique of measurement avoids the production or detection of such activation, then obviously no auxiliary measurement of such masking activation need be made for the purpose of correction or compensation. In such cases only two measurements need be made, namely the intensity of activation radiation, and the thermal neutron capture cross section. The desired assay measurement will then comprise, as previously explained, the product of the respective measurements in each logging interval. Elements other than aluminum which may be detected by thermal neutron activation include magnesium, vanadium, sodium, cobalt, and silver. Of these and other detectable elements, aluminum is the only isotope which has the specific detection problem that the silicon (n,p) reaction produces the same activated isotope. Thus, other elements may generally be detected without a silicon correction. In general, the isotope to be detected is characterized by a specific gamma ray energy and a specific halflife. To avoid obscuring background effects from undesired elements, the measurement may be made at an appropriate time after irradiation such that the undesirable radiation is reduced in its effect. For example, oxygen activation, if present, may be effectively eliminated by delaying the measurement for about 1 minute following irradiation, during which time the 7.3 second oxygen activation will disappear whereas longer lived activation due to aluminum for example would remain.

Additionally, it is well known in the art to employ spectral analysis of the detected radiation to effectively discriminate against undesired elements and in favor of desired elements. For example, if sodium were to be detected, the radiation detection system might be arranged to respond preferentially to gamma rays having energy of 1.37 mev, the energy of a large proportion of the gamma rays emitted by activated sodium. If activated silicon were present with its energy of 1.78 mev the latter would be largely undetected, thereby reducing the need for compensating or correcting methods, since any activation which goes undetected, by design or otherwise, has no more effect than if the element were in fact absent.

It is to be understood that the various logs may be recorded on magnetic tape and the various computations done with a computer according to procedures and apparatus known in the art. It is also to be understood that the system described is not limited to earth boreholes but may be used in all other situations and circumstances wherein a mineral assay is desirable.

The embodiments of the invention in which an exclusive property or privilege is claimed are defined as follows:

1. A method of thermal neutron activation logging for determining the existence and quantity of at least one specific element in subsurface earth formations penetrated by a borehole comprising the steps of:
    irradiating the formations surrounding the borehole with neutrons,
    measuring activation radiation resulting from thermal neutron capture by an element of the formation,
    measuring the thermal neutron capture cross section of the formation, and
    deriving a quantity proportional to the product of the measured activation radiation and the measured thermal neutron capture cross section of the formation.

2. The method of claim 1 wherein the measured activation radiation is that resulting from thermal neutron capture by a preselected element.

3. The method of claim 2 wherein said preselected element is aluminum.

4. The method of claim 1 wherein the measured activation radiation is specific gamma radiation resulting from activation of a specific element by thermal neutron capture.

5. The method of claim 1 wherein the activation radiation is from a specific element and is measured to the exclusion of other radiation by selectively measuring gamma rays having energies characteristic of said specific element.

6. The method of claim 1 including the steps of determining the effect of natural gamma radiation from said formations on the measurement of activation radiation and subtracting said effect from the measurement of activation radiation, said subtraction being done prior to the step of deriving a quantity proportional to the product of the activation radiation and the neutron capture cross section.

7. The method of claim 1 wherein the step of measuring the thermal neutron capture cross section of the formation comprises the steps of:
    irradiating the formations surrounding the borehole with neutrons,
    detecting radiations from the formations during a first time interval,
    detecting radiations from the formations during a second time interval, and
    comparing the radiations detected during the first time interval with those detected during the second time interval as an indication of the thermal neutron capture cross section.

8. A method of activation logging in an earth borehole comprising the steps of:
    irradiating the formations surrounding the borehole with neutrons,
    measuring activation radiation resulting from thermal neutron capture by elements of the formations, correlated with depth in the borehole,
    measuring the thermal neutron capture cross section of the formations, correlated with depth in the borehole,
    deriving a quantity proportional to the product of the depth correlated activation radiation and the corresponding thermal neutron capture cross section for that depth, and
    recording said quantity correlated with depth in the borehole.

9. The method of claim 8 wherein the measured activation radiation results from thermal neutron capture by a specific element.

10. The method of claim 9 wherein said specific element is aluminum.

11. The method of claim 10 including the steps of obtaining a silicon log and correcting the activation radiation measurement for the effect of silicon.

12. The method of claim 11 wherein the irradiating neutrons are predominantly neutrons having energies less than 3.9 mev.

13. The method of claim 12 wherein the neutrons are obtained from a californium-252 neutron source.

14. The method of claim 13 wherein a scintillation counter is employed as the radiation detector.

* * * * *